(12) United States Patent
Fujimura et al.

(10) Patent No.: US 8,311,146 B2
(45) Date of Patent: Nov. 13, 2012

(54) RADIO COMMUNICATION SYSTEM

(75) Inventors: Akinori Fujimura, Tokyo (JP); Yasushi Sogabe, Tokyo (JP); Fumio Ishizu, Tokyo (JP); Tadashi Takagi, Miyagi (JP); Hiroyuki Nakase, Miyagi (JP); Kazuo Tsubouchi, Miyagi (JP); Suguru Kameda, Miyagi (JP); Shoichi Oshima, Miyagi (JP)

(73) Assignees: Mitsubishi Electric Corporation, Tokyo (JP); Tohoku University, Sendai-shi (JP)

( * ) Notice: Subject to any disclaimer, the term of this patent is extended or adjusted under 35 U.S.C. 154(b) by 516 days.

(21) Appl. No.: 12/529,346

(22) PCT Filed: Mar. 4, 2008

(86) PCT No.: PCT/JP2008/053853
§ 371 (c)(1),
(2), (4) Date: Nov. 9, 2009

(87) PCT Pub. No.: WO2008/108366
PCT Pub. Date: Sep. 12, 2008

(65) Prior Publication Data
US 2010/0054357 A1 Mar. 4, 2010

(30) Foreign Application Priority Data
Mar. 6, 2007 (JP) ................. 2007-055936

(51) Int. Cl.
*H04L 27/00* (2006.01)
(52) U.S. Cl. ........ 375/295; 375/260; 375/274; 375/305; 375/316; 375/336

(58) Field of Classification Search ............. 375/135, 375/136, 146, 147, 219, 260, 271, 274, 295, 375/305, 316, 322, 336, 344, 346, 349
See application file for complete search history.

(56) References Cited

U.S. PATENT DOCUMENTS

| | | | |
|---|---|---|---|
| 7,110,433 B2 * | 9/2006 | Feher | 375/141 |
| 7,224,742 B2 * | 5/2007 | Cleveland et al. | 375/260 |
| 7,274,753 B2 * | 9/2007 | Van De Beek et al. | 375/308 |

(Continued)

FOREIGN PATENT DOCUMENTS
JP 8 316851 11/1996
(Continued)

*Primary Examiner* — Hirdepal Singh
(74) *Attorney, Agent, or Firm* — Oblon, Spivak, McClelland, Maier & Neustadt, L.L.P.

(57) ABSTRACT

A transmission device (10) includes: a series/parallel converter (11); an MSK modulator (31) for modulating a signal on a channel basis; a D/A converter (13); a frequency converter (14a) for conversion into different carrier frequencies; a synchronization circuit (32); an amplifier (15); a multiplexer (16) for multiplexing amplification signals; and an antenna (19). A reception device (20) includes: an antenna (21); a demultiplexer (22); a frequency converter (23) for converting signal demultiplexed on a channel basis into a baseband frequency; a low-pass filter (33) for removing a higher-harmonic component of the signal; an A/D converter (24); a digital filter (36) for extracting a main wave component from the digital signal; a sampling point detection circuit (35a) for detecting a sampling point from the main wave component; an MSK demodulator (34a) for reproducing and demodulating a symbol point based on detection information by an interpolation process; and a parallel/series converter (26) for restoring an original signal from the demodulated signal.

8 Claims, 14 Drawing Sheets

U.S. PATENT DOCUMENTS

| | | | |
|---|---|---|---|
| 7,496,131 B2* | 2/2009 | Doi | 375/148 |
| 2003/0231058 A1* | 12/2003 | Ezuka | 330/149 |
| 2004/0087294 A1* | 5/2004 | Wang | 455/276.1 |
| 2004/0101073 A1 | 5/2004 | Doi | |
| 2005/0105632 A1* | 5/2005 | Catreux-Erces et al. | 375/267 |
| 2008/0095267 A1* | 4/2008 | Beaulieu et al. | 375/299 |
| 2009/0088091 A1* | 4/2009 | Shen et al. | 455/102 |
| 2012/0093039 A1* | 4/2012 | Rofougaran et al. | 370/278 |

FOREIGN PATENT DOCUMENTS

| | | |
|---|---|---|
| JP | 2004 173020 | 6/2004 |
| WO | 2005 025079 | 3/2005 |

\* cited by examiner

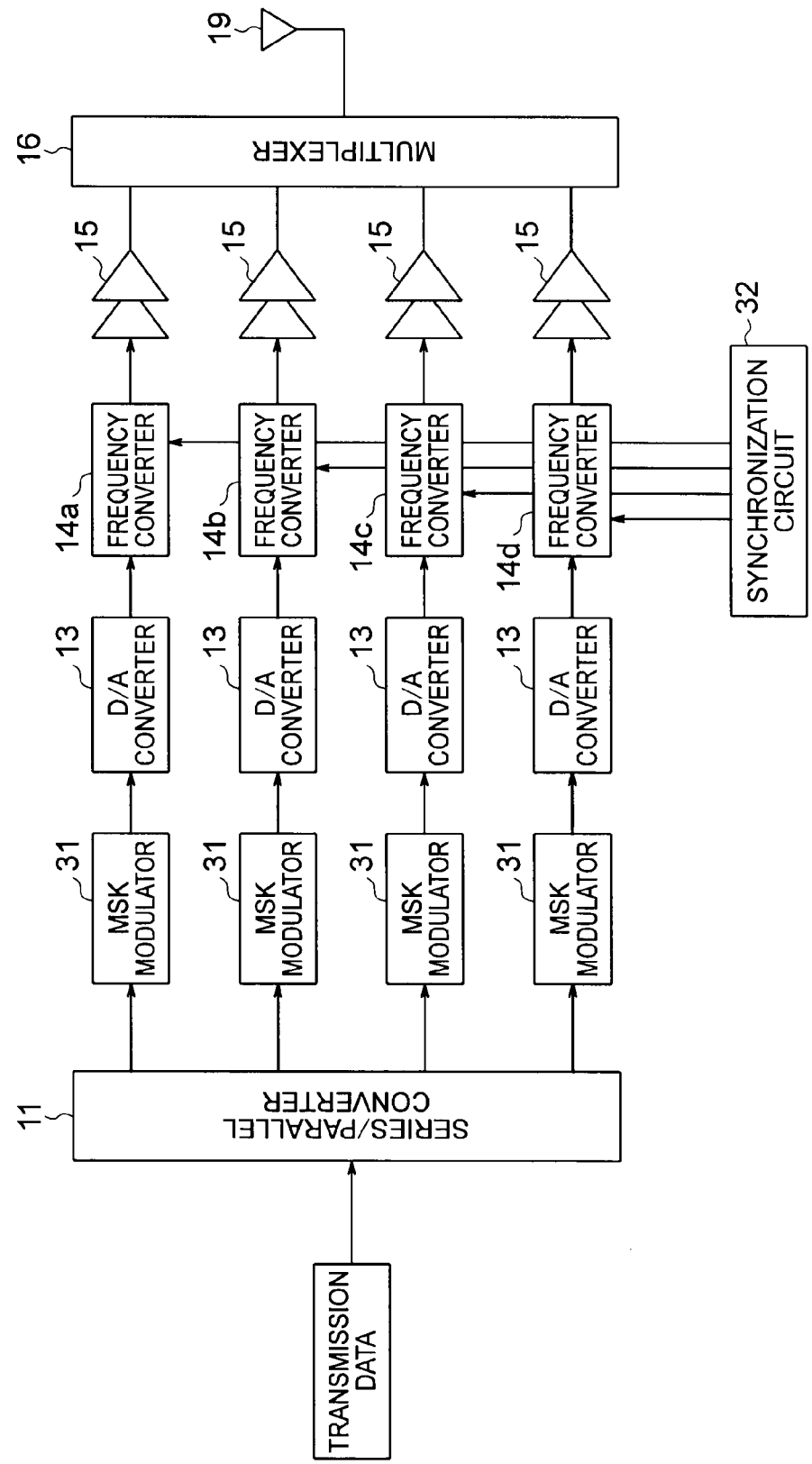

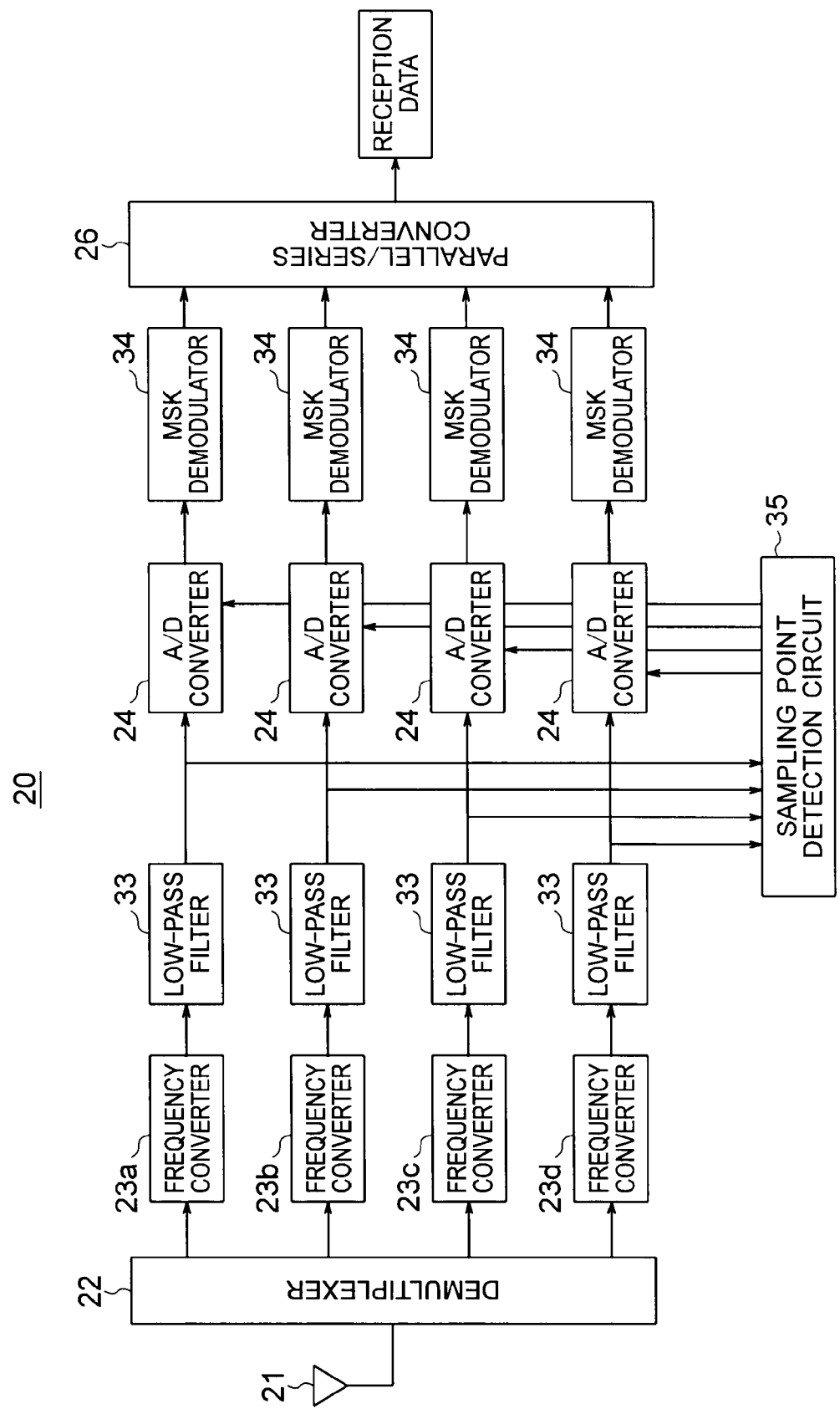

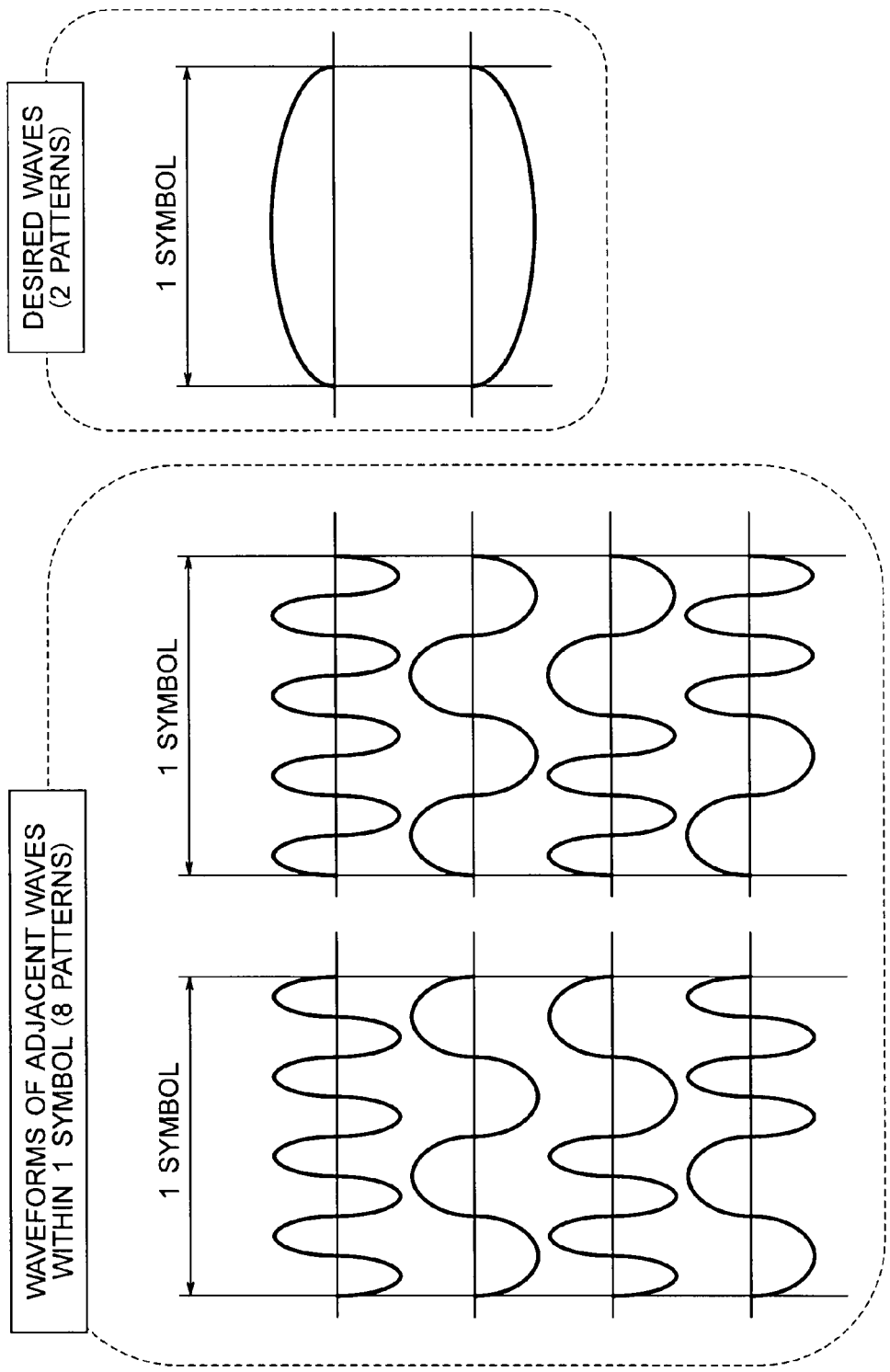

RADIO COMMUNICATION SYSTEM

TECHNICAL FIELD

The present invention relates to a radio communication system, and more particularly, to a radio communication system including a radio transmission device and a radio reception device, for transmitting a signal at high speed.

BACKGROUND ART

As a method for transmitting a signal at high speed in digital radio communications, it is common to use (1) a method of increasing a symbol rate or (2) a method of performing multilevel modulation.

However, in the case (1) of increasing the symbol rate, it is necessary to increase a speed of digital circuits such as an A/D converter and a D/A converter or broaden a band of a baseband circuit, which raises a problem that those circuits may be hard to realize or their power consumption may considerably increase.

Meanwhile, in the latter case (2) of performing the multilevel modulation, a load on the digital circuit or the baseband circuit is reduced, but an envelope of a modulated signal fluctuates, thereby increasing a ratio of a peak power to an average power of the signal (peak to average power ratio (PAPR)). To linearly amplify such a signal having a large PAPR, it is necessary to use an amplifier having a large saturation power, and further necessary to operate the amplifier with a back-off at a sufficient level from a saturation power, but there is a problem that the amplifier operated with a large back-off exhibits a considerably low efficiency.

In particular, in a communication system using a microwave or millimeter wave range in which an amplifier having a high power and a high efficiency is hard to realize, a transmission device is high in cost and considerably low in efficiency, which results in a problem that an expensive heat radiator becomes necessary or other such problem.

Further, for another scheme for performing high-speed transmission by radio communications, there is a method of using multiple carriers. FIG. 13 is a block diagram illustrating a configuration of a conventional radio transmission device which uses multiple carriers (see, for example, Patent Document 1).

In the conventional radio transmission device illustrated in FIG. 13, an input digital signal is input in series to a data input section 101, the serial input digital signal input to the data input section 101 is subjected to serial-to-parallel conversion into a plurality of channels by a series/parallel converter 102, and the converted digital signal in each of the channels is encoded by a convolutional encoder 103. The convolutionally encoded digital signal is multilevel-modulated by a modulator 104. The multilevel-modulated signals are converted into a plurality of signals having different carrier frequencies by frequency converters 105a to 105d, then the plurality of signals are synthesized by a multiplexer 106, and after that, the resultant is radio-transmitted from an antenna 107.

In such a conventional radio transmission device, since the carrier frequencies of the radio-transmitted signals are discrete, the signals adjacent in frequency are unlikely to simultaneously disappear due to fading, and since the convolutionally encoded signals are used, even if a part of signals disappear, the part can be restored, which makes it possible to realize a radio device which exhibits satisfactory communication quality even under a fading environment. However, there occurs a problem that a frequency bandwidth of the channels as a whole becomes broader.

Further, although not particularly illustrated in the block diagram of the conventional radio transmission device of FIG. 13, in a case of structuring and configuring the device in actuality, it becomes possibly necessary to use an amplifier to obtain an electric power required to perform radio transmission. In this case, as illustrated in FIG. 14, one amplifier 108 may be inserted between the multiplexer 106 and the antenna 107. However, in the case of FIG. 14, in order to amplify the multiplexed signals, signals having a large PAPR are input to the amplifier 108. Therefore, it is necessary to use the amplifier 108 having a large saturation power, and the amplifier 108 is also used with a back-off from a saturation power level, which raises a problem that the efficiency of the amplifier 108 becomes lower. In a case of a multicarrier scheme using a fast Fourier transfer (FFT) and an inverse FFT (IFFT), a circuit configuration of FIG. 14 is employed, which leads to an extremely large problem.

Patent Document 1: JP 3346945 B

DISCLOSURE OF THE INVENTION

Problems to be Solved by the Invention

As described above, in order to perform high-speed radio communications in the conventional radio communication device, there are problems of an increased load on an analog circuit such as an amplifier and a reduced frequency use efficiency.

The present invention has been made in view of the above-mentioned problems, and an object thereof is to provide a system capable of high-speed communications while preventing the load on an analog circuit (amplifier) from increasing and the frequency use efficiency from reducing by using: MSK modulation, which is a constant envelope modulation scheme; a phase modulation scheme; an amplitude modulation scheme; a frequency modulation scheme; or a modulation scheme of combination thereof, as the multicarrier scheme and by enabling frequency spectra of signals in respective channels to overlap in a method of individually amplifying modulated signals.

Means for Solving the Problems

According to the present invention, a radio communication system includes: a radio transmission device; and a radio reception device, the radio communication system being for communicating a signal between the radio transmission device and the radio reception device by using multiple carriers. The radio transmission device includes: splitting means for splitting an input digital signal into a plurality of channels; modulating means for modulating a digital signal obtained on a channel basis by the splitting performed by the splitting means into a constant-envelope-modulated signal, and converting the constant-envelope-modulated signal into an analog signal; a first frequency converting means for subjecting the constant-envelope-modulated signal, which has been converted into the analog signal and obtained on a channel basis from the modulating means, to frequency conversion with each of carrier frequencies in which frequencies in respective adjacent channels are mapped at frequency intervals each set to be less than 3 times as large as a symbol rate of each channel; amplifying means for amplifying the constant-envelope-modulated signal, which has been converted into the analog signal and converted on a channel basis into each of different carrier frequencies by the first frequency converting means, individually with a high efficiency; and transmission means for radio-transmitting the constant-envelope signal, which has been converted into the analog signal and amplified on a channel basis by the amplifying means, to a space on a channel basis. The radio reception device includes: receiving means for radio-receiving the constant-envelope-modulated signal, which has been converted into the analog signal and radio-transmitted to the space; a second frequency converting means for converting the constant-envelope-modulated signal, which has been converted into the analog signal and received by the receiving means, into each of baseband frequencies in different channels on a carrier frequency basis, and converting the constant-envelope-modulated signal into a digital signal; demodulating means for demodulating the constant-envelope-modulated signal, which has been converted on a channel basis into the baseband frequency and converted into the digital signal by the second frequency converting means; and restoring means for restoring an original digital signal from the digital signal, which has been demodulated on a channel basis by the demodulating means.

Effects of the Invention

According to the present invention, a radio communication system includes: a radio transmission device; and a radio reception device, the radio communication system being for communicating a signal between the radio transmission device and the radio reception device by using multiple carriers. The radio transmission device includes: splitting means for splitting an input digital signal into a plurality of channels; modulating means for modulating a digital signal obtained on a channel basis by the splitting performed by the splitting means into a constant-envelope-modulated signal, and converting the constant-envelope-modulated signal into an analog signal; a first frequency converting means for subjecting the constant-envelope-modulated signal, which has been converted into the analog signal and obtained on a channel basis from the modulating means, to frequency conversion with each of carrier frequencies in which frequencies in respective adjacent channels are mapped at frequency intervals each set to be less than 3 times as large as a symbol rate of each channel; amplifying means for amplifying the constant-envelope-modulated signal, which has been converted into the analog signal and converted on a channel basis into each of different carrier frequencies by the first frequency converting means, individually with a high efficiency; and transmission means for radio-transmitting the constant-envelope signal, which has been converted into the analog signal and amplified on a channel basis by the amplifying means, to a space on a channel basis. The radio reception device includes: receiving means for radio-receiving the constant-envelope-modulated signal, which has been converted into the analog signal and radio-transmitted to the space; a second frequency converting means for converting the constant-envelope-modulated signal, which has been converted into the analog signal and received by the receiving means, into each of baseband frequencies in different channels on a carrier frequency basis, and converting the constant-envelope-modulated signal into a digital signal; demodulating means for demodulating the constant-envelope-modulated signal, which has been converted on a channel basis into the baseband frequency and converted into the digital signal by the second frequency converting means; and restoring means for restoring an original digital signal from the digital signal, which has been demodulated on a channel basis by the demodulating means. Therefore, effects that an efficiency of the amplifier and the frequency use efficiency are high even when a signal is transmitted at high speed and that it is easy to structure and configure the system are attained.

BRIEF DESCRIPTION OF THE DRAWINGS

FIG. 1 is a block diagram illustrating a configuration of a radio transmission device included in a radio communication system according to a first embodiment of the present invention.

FIG. 3 is a block diagram illustrating a configuration of a radio reception device included in the radio communication system according to the first embodiment of the present invention.

FIG. 4 is a diagram illustrating a temporal signal generated in the radio communication system according to the first embodiment of the present invention.

BEST MODE FOR CARRYING OUT THE INVENTION

First Embodiment

Figure 5:
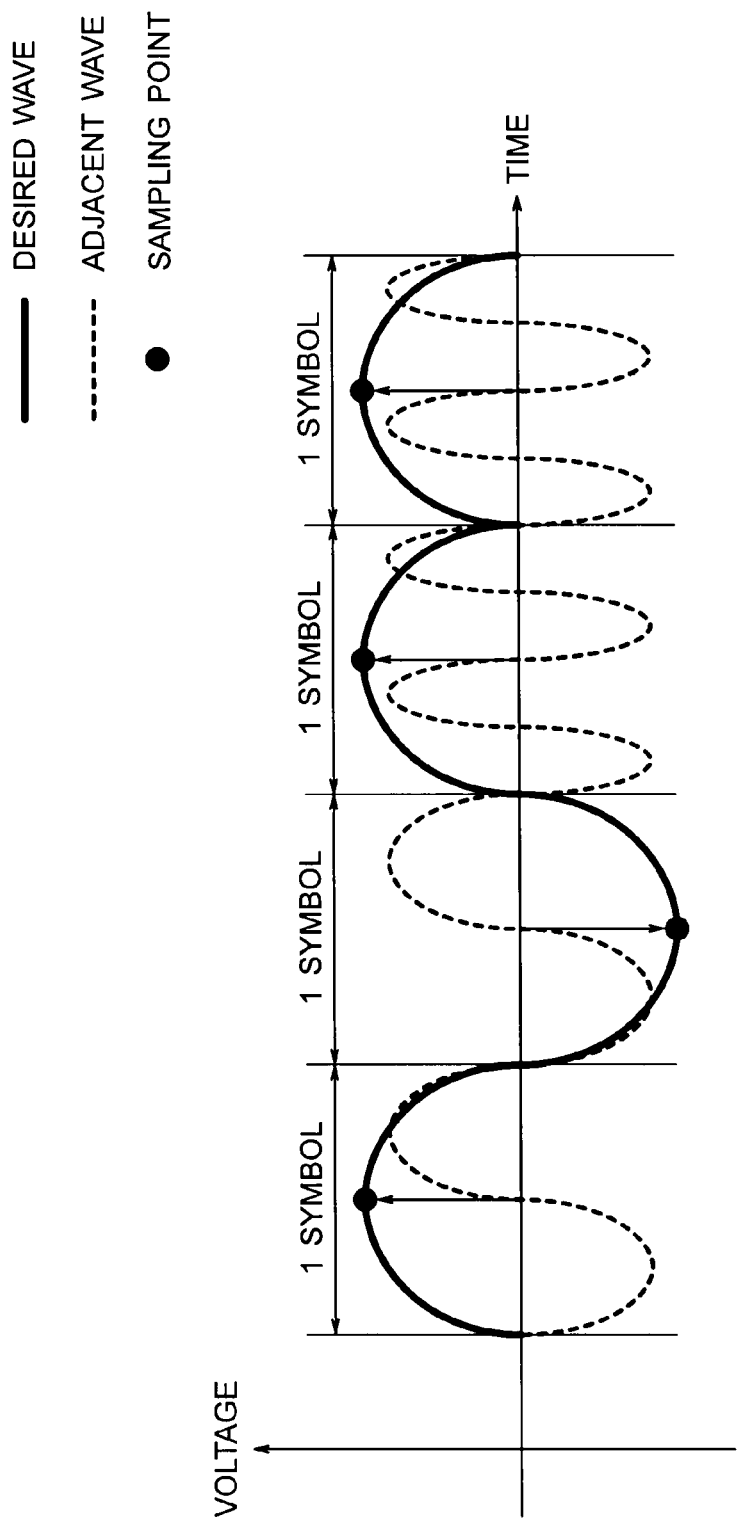
FIG. 5 is a diagram illustrating a temporal signal generated in the radio communication system according to the first embodiment of the present invention.
Figure 6:
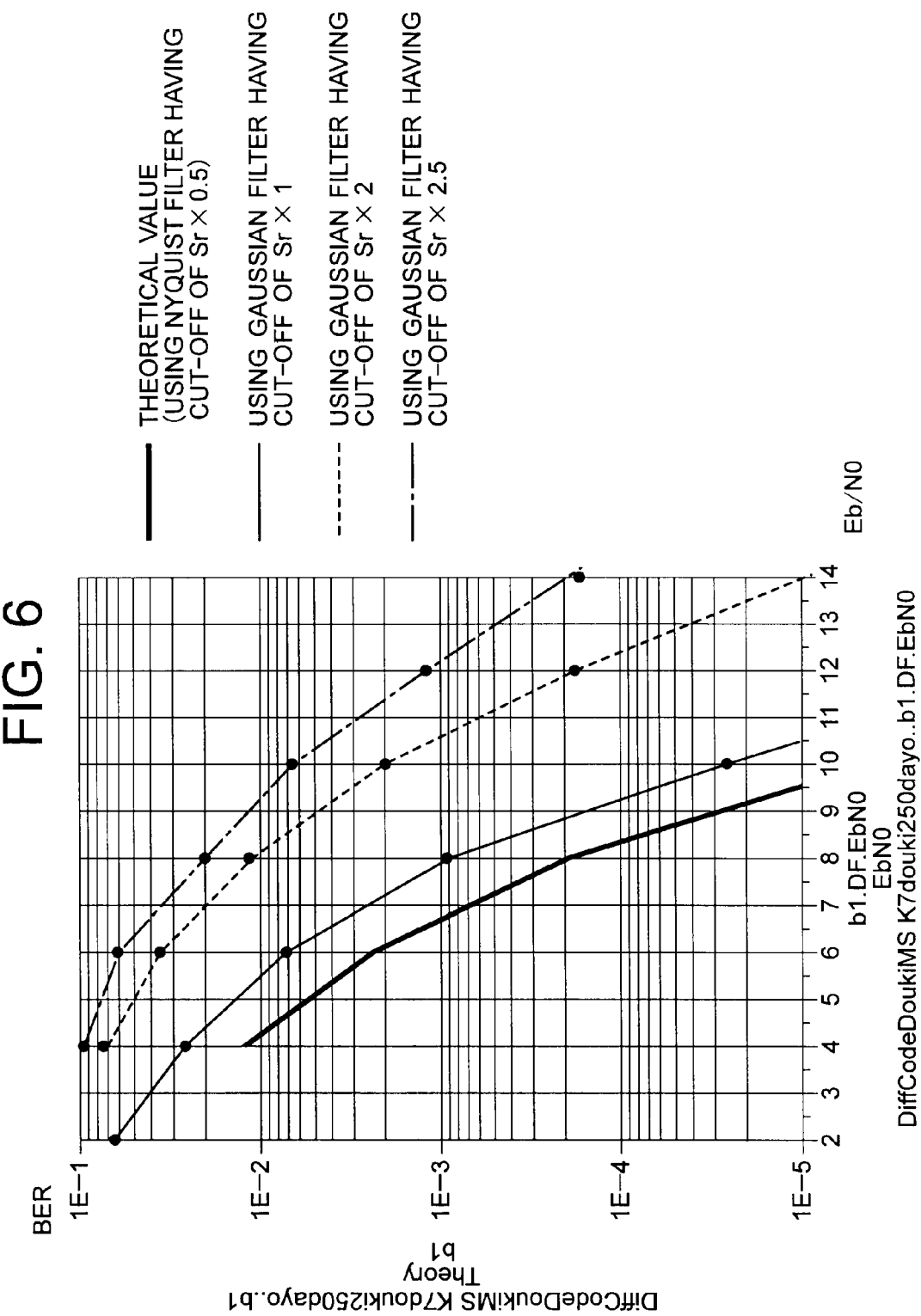
FIG. 6 is a diagram illustrating simulation results produced in the radio communication system according to the first embodiment of the present invention.
Figure 7:
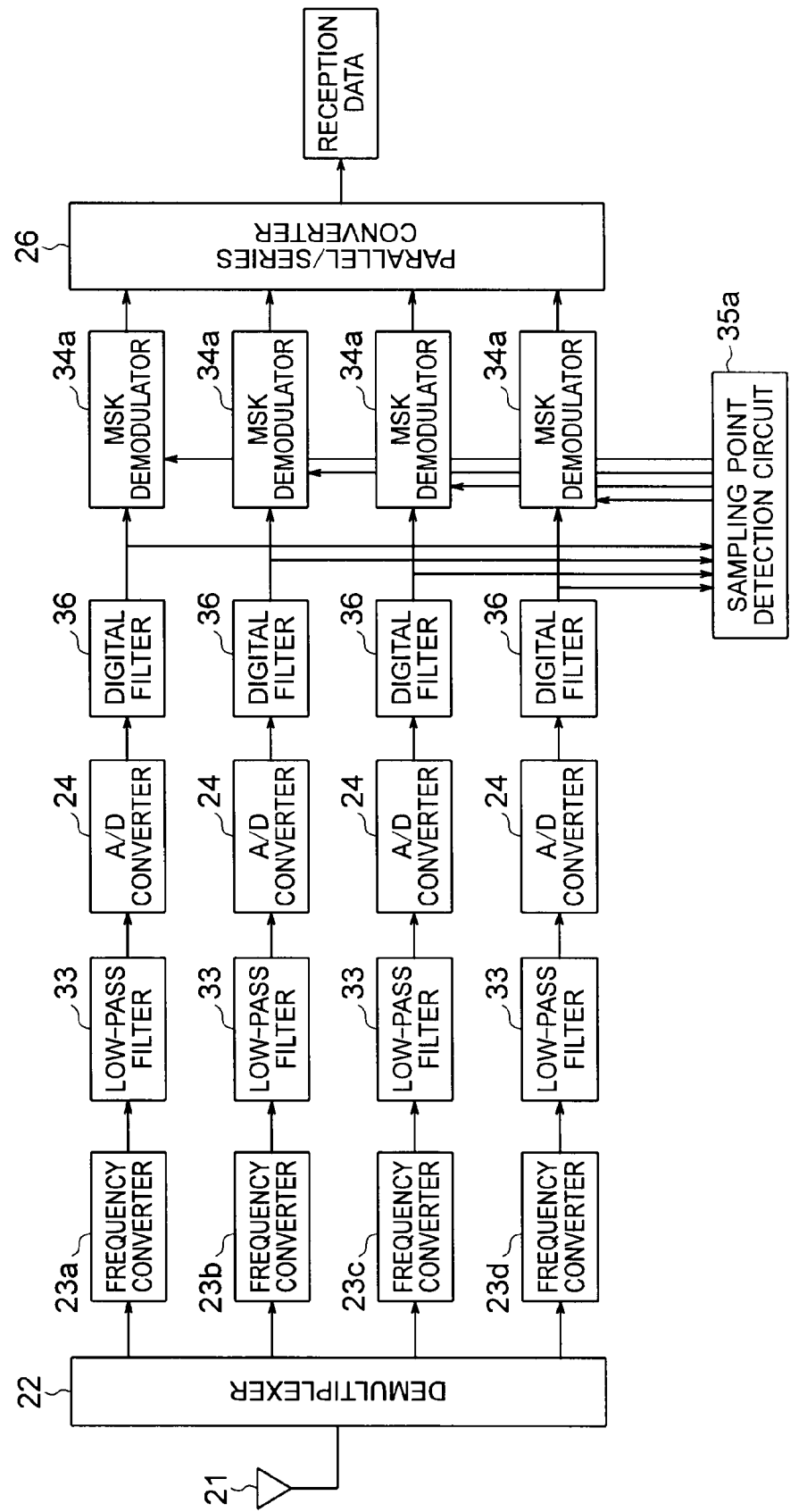
FIG. 7 is a block diagram illustrating a configuration of the radio reception device included in the radio communication system according to the first embodiment of the present invention.

Description is made of a radio communication system according to a first embodiment of the present invention with reference to FIGS. 1, 2, 3, 4, 5, 6, and 7. FIGS. 1, 3, and 7 are block diagrams illustrating configurations of a radio transmission device and a radio reception device that are included in the radio communication system according to the first embodiment of the present invention. Further, FIG. 2 are diagrams illustrating frequency spectra exhibited in the radio communication system according to the first embodiment of the present invention, FIGS. 4 and 5 each illustrate a temporal signal generated upon demodulation according to the first embodiment, and FIG. 6 illustrates simulation results related to the first embodiment. Note that hereinafter, the same or equivalent portions across the figures are denoted by the same reference symbol.

In FIG. 1, a radio transmission device 10 of the radio communication system according to the first embodiment includes: a series/parallel converter (splitting means) 11, to which data to be transmitted (hereinafter, referred to as "transmission data") formed of an input digital signal is input, for splitting the transmission data into the number of channels; a plurality of minimum shift keying (MSK) modulators 31 having the number thereof corresponding to the number of channels, to which the split transmission data is input; a plurality of D/A converters 13 for converting each of digitally modulated signals output from the MSK modulators 31 into an analog signal; a synchronization circuit 32; frequency converters (first frequency converting means) 14a, 14b, 14c, and 14d for controlling respective analog signals to have their phases synchronized by the synchronization circuit 32 and to have their frequencies each set to be 1.5 times as large as a symbol rate of each channel; amplifiers (amplifying means) 15 for amplifying the respective analog signals whose frequencies have been converted; a multiplexer (multiplexing means) 16 for adding a plurality of amplified analog signals having the number thereof corresponding to the number of channels; and a transmission-purpose antenna 19 for transmitting the added analog signals. Note that the MSK modulator 31 and the D/A converter 13 constitute modulating means.

Hereinafter, the figures are used to describe an operation with regard to the first embodiment for a case where the number of channels is set to 4.

On a side of the radio transmission device 10, as illustrated in FIG. 1, transmission data formed of an input digital signal is split into 4 channels by the series/parallel converter 11, and respective digital signals that have been obtained by the splitting are modulated by the 4 MSK modulators 31 into MSK modulation (which is a constant envelope modulation scheme) signals (constant-envelope-modulated signals). Then, the D/A converters 13 convert the MSK-modulated signals that have been modulated on a channel basis into analog signals, and the analog signals in the respective channels are subjected to frequency conversion by the frequency converters 14a, 14b, 14c, and 14d. Note that the frequency conversion is performed by in-phase carrier frequencies and having the phases aligned, in which frequencies in respective adjacent channels are mapped at frequency intervals each set to be less than 3 times as large as the symbol rate of each channel by the synchronization circuit 32. Herein, for example, the frequency conversion is performed by the in-phase carrier frequencies having the frequency intervals each set to be 1.5 times as large as the symbol rate. Then, the respective signals are amplified individually with a high efficiency by the amplifier 15, and the signals in the respective channels are added by the multiplexer 16, and after that, sent out to a space by the antenna 19.

Figure 2A:
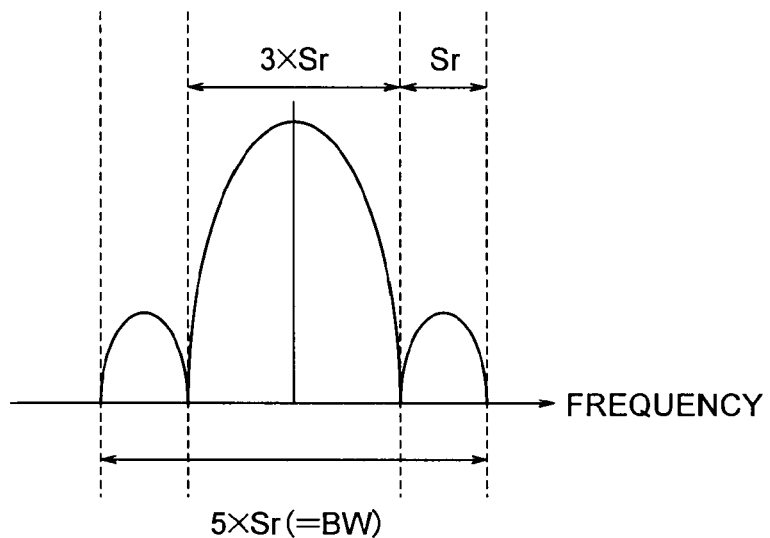
FIGS. 2A and 2B are diagrams illustrating frequency spectra exhibited in the radio communication system according to the first embodiment of the present invention.
Figure 2B:
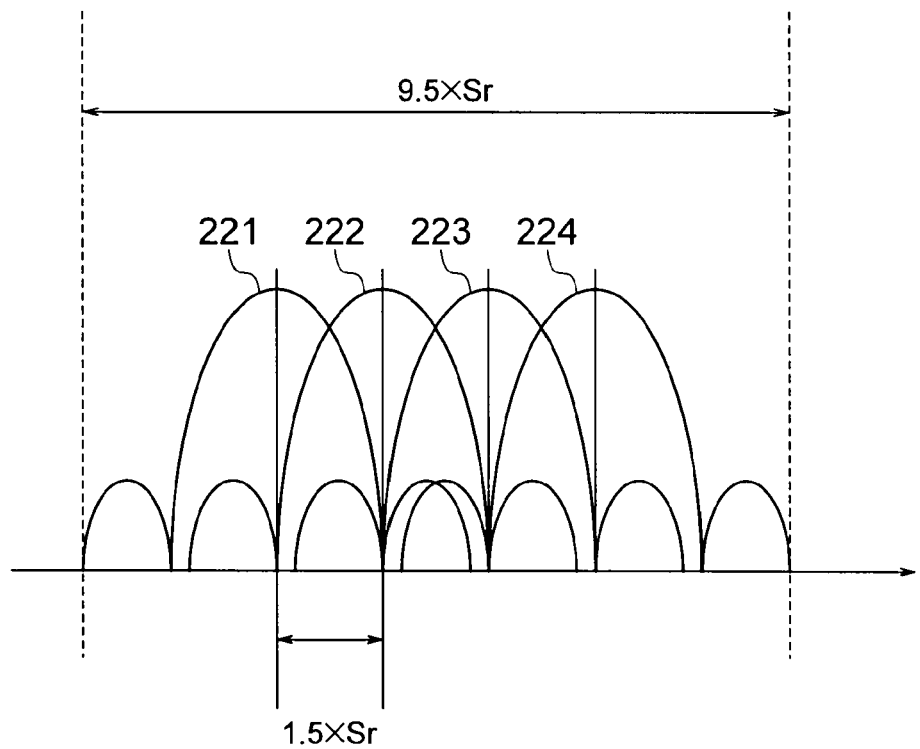

FIG. 2B illustrates frequency spectra exhibited when sent out to the space. In the figure, a signal 221 is a signal in a first channel whose frequency has been converted by the frequency converter 14a of the radio transmission device 10, a signal 222 is a signal in a second channel whose frequency has been converted by the frequency converter 14b, a signal 223 is a signal in a third channel whose frequency has been converted by the frequency converter 14c, and a signal 224 is a signal in a fourth channel whose frequency has been converted by the frequency converter 14d.

In the first embodiment, since higher speed is realized by performing multilevel conversion by means of hardware, in a case of splitting into 4 channels, it is possible to provide a speed equivalent to a case of transmission by 1 channel with a quadruple multilevel factor or with a quadruple symbol rate. Therefore, it is possible to alleviate problems with a higher-speed operation of a digital circuit and a broader band of a baseband circuit, which are detrimental effects exerted by increasing a symbol rate and making a speed higher by performing multilevel modulation. It is also possible to eliminate a decrease in efficiency due to a PAPR problem derived from fluctuation of an envelope of a signal by individually amplifying a constant envelope MSK-modulated signal. Further, it is possible to greatly reduce an occupied frequency bandwidth compared to the conventional MSK.

Assuming that a signal bandwidth (single-channel occupied bandwidth) necessary per channel is represented by "Bw" and that the symbol rate of 1 channel is represented by "Sr", an MSK spectrum of 1 wave has a width of 5 Sr (=Bw) as illustrated in FIG. 2A, and in a case of using, for example, 4 channels, the whole channels require a band having a width of 20 Sr (=Bw×4 channels) when spectra thereof are mapped so as not to overlap each other, but as illustrated in FIG. 2B, the entire frequency bandwidth necessary in the first embodiment can be reduced to, for example, 9.5 Sr (=1.9 Bw).

In the MSK modulation, by setting the frequency interval between adjacent channels to be 1.5 times as large as the symbol rate, a center point of the frequency spectrum of a desired channel is overlapped with a point to be 0 in the frequency spectrum of an adjacent channel, and hence an amount by which a bit error rate (BER) for the MSK modulation deteriorates from a theoretical value can be suppressed to a lower level. When the desired channel is demodulated, another channel becomes a disturbing wave component, and hence it is necessary to remove the other channels. In FIG. 2B, in a case where the desired channel is the signal 221, the signals 222, 223, and 224 become disturbing wave components. In this case, the signals 223 and 224 whose spectra do not have their main components overlapped with a main component of the spectrum of the signal 221 can be removed by being passed through a filter. Further, in the case where the frequency interval between channels is set to be 1.5 times as large as the symbol rate, a component of the signal 222 having the spectrum overlapped with the spectrum of the signal 221 can be removed as well. Hereinbelow, 2 examples thereof are presented.

First, Example 1 is presented.

FIG. 3 illustrates a radio reception device 20 for demodulating the transmission data transmitted from the radio transmission device 10 of the radio communication system according to the first embodiment. The radio reception device 20 includes: a reception-purpose antenna 21 for receiving reception data formed of the analog signal transmitted from the radio transmission device 10; a demultiplexer (demultiplexing means) 22 for demultiplexing the received reception data into the number of channels; frequency converters 23a, 23b, 23c, and 23d for converting frequencies of respective analog signals resulting from the demultiplexing into baseband frequencies of channels that are different on a carrier frequencies basis; low-pass filters 33 each having a cut-off frequency set to be 0.5 to 2.5 times as large as a symbol rate of each channel; a sampling point detection circuit 35; A/D converters 24 that are each controlled by the sampling point detection circuit 35 to accurately sample a center point of a demodulation symbol; MSK demodulators (demodulating means) 34 for demodulating a signal that has been digitized by the A/D converter 24; and a parallel/series converter (restoring means) 26 for adding the respective demodulated digital signals. Note that the frequency converter 23 and the A/D converter 24 constitute a second frequency converting means.

First, the respective low-pass filters 33 remove signal 223 and 224 components illustrated in FIG. 2B. That is, influences exerted by the channels having the spectra not overlapped with the spectrum of the signal 221 are removed by the low-pass filters 33. Then, the sampling point detection circuit 35 performs sampling point detection by using output data output from the low-pass filters 33 or output data output from the A/D converters 24 at the subsequent stage. Each of the A/D converters 24 samples the center point of the symbol based on symbol timing information detected by the sampling point detection circuit 35, to thereby remove a signal 222 component illustrated in FIG. 2B. That is, herein, an influence exerted by the adjacent channel having the spectrum overlapped with the spectrum of the signal 221 is removed.

Hereinafter, numerical expressions are used to explain that the signal 222 component illustrated in FIG. 2B can be removed by sampling a symbol point.

In a case of realizing an MSK wave by using a quadrature modulator, assuming that: signals indicating "0" and "1" in a symbolic string subjected to parallel conversion are made to correspond to "−1" and "1", respectively; signals having periods each shifted by a half of a symbol rate are represented by "a(t)" and "b(t)"; the symbol rate of each channel is represented by "Sr"; and a frequency of an oscillator is represented by "fc", signals on the I axis and the Q axis are expressed by:

$$I \text{ axis: } a(t) \times \cos(2\pi fct) \times \cos(2\pi t \times Sr/2), a(t)=\pm 1$$

$$Q \text{ axis: } b(t) \times \sin(2\pi fct) \times \sin(2\pi t \times Sr/2), b(t)=\pm 1 \qquad \text{[Expression 1]}$$

The sum thereof becomes an MSK-modulated wave, and an MSK-modulated wave "s(t)" is expressed by:

$$s(t,fc)=\cos\{2\pi(fc-a(t)\times b(t)\times Sr/2)t+\phi\}, \phi=0(a(t)=1), \pi(a(t)=-1) \qquad \text{[Expression 2]}$$

Changes of a(t) and b(t) correspond to the frequencies "fc+Sr/2" and "fc−Sr/2", and changes in phase are continuous. Therefore, the amplitude becomes a constant envelope. In the case of the proposed scheme, a signal propagated into a space becomes:

$$s(t,f1)+s(t,f2)+s(t,f3)+s(t,f4) \qquad \text{[Expression 3]}$$

Herein, a subcarrier "s(t, fn+1)" adjacent to "s(t, fn)" has a frequency interval set to be:

$$\Delta f=|fn+1-fn|=1.5\times Sr \qquad \text{[Expression 4]}$$

To demodulate data on "s(t, f1)" there among on a receiver side, after amplifying a reception signal, the signal is split by a distributor, and carriers having a frequency "f1" are multiplied by a mixer. In the case of using a quadrature demodulator, a demodulated signal of "s(t, f1)" on the I axis becomes:

$$I \text{ axis: } s(t, f1) \times \cos(2\pi f1 t) = \qquad \text{[Expression 5]}$$
$$\{a(t)\times\cos(2\pi f1 t)\times\cos(2\pi t \times Sr/2)\}\times\cos(2\pi f1 t) +$$
$$\{b(t)\times\sin(2\pi f1 t)\times\sin(2\pi t \times Sr/2)\}\times$$
$$\cos(2\pi f1 t) =$$
$$a(t)\times\cos(2\pi t \times Sr/2)\times\{1+\cos(4\pi f1 t)\}/2 +$$
$$b(t)\times\sin(2\pi t \times Sr/2)\}\times\cos(4\pi f1 t)$$

When a high frequency component is removed by a low-pass filter, a signal expressed as:

$$I \text{ axis: } s(t, f1) \times \cos(2\pi f1 t) = a(t) \times \cos(2\pi t \times Sr/2) \qquad \text{[Expression 6]}$$

is obtained. Similarly on the Q axis, $$Q \text{ axis: } s(t, f1) \times \sin(2\pi f1 t) = b(t) \times \sin(2\pi t \times Sr/2) \qquad \text{[Expression 7]}$$

is obtained. At this time, a component of the adjacent "s(t, f2)" coexists, and with respect to a wave thereof, $$I \text{ axis: } s(t, f2) \times \cos(2\pi f1 t) = \qquad \text{[Expression 8]}$$
$$\{c(t)\times\cos(2\pi f2 t)\times\cos(2\pi t \times Sr/2)\}\times\cos(2\pi f1 t) +$$
$$\{d(t)\times\sin(2\pi f2 t)\times\sin(2\pi t \times Sr/2)\}\times\cos(2\pi f1 t) =$$
$$c(t)\times\cos(2\pi t \times Sr/2)\times$$
$$\{\cos 2\pi(f1+f2)t+\cos 2\pi(f1-f2)t\}/2 +$$
$$d(t)\times\sin(2\pi t \times Sr/2)\times$$
$$\{\sin 2\pi(f1+f2)t-\sin 2\pi(f1-f2)t\}/2$$

is obtained. When a high frequency component is removed by the low-pass filter, in a case where the frequency interval between the respective adjacent channels is set to be 1.5 times as large, $$I \text{ axis: } s(t, f2) \times \cos(2\pi f1 t) = \qquad \text{[Expression 9]}$$
$$c(t)\times\cos(2\pi t \times Sr/2)\times\cos(2\pi t \times 1.5 \times Sr)/2 +$$
$$d(t)\times\sin(2\pi t \times Sr/2)\times\sin(2\pi t \times 1.5 \times Sr)/2 =$$
$$c(t)\times\{\cos(2\pi t \times Sr)+\cos(2\pi t \times 2 \times Sr)\} +$$
$$d(t)\times\{\cos(2\pi t \times Sr)-\cos(2\pi t \times 2 \times Sr)\}$$

is obtained. Similarly on the Q axis, $$Q \text{ axis: } s(t, f2) \times \sin(2\pi f1 t) = -c(t)\times \qquad \text{[Expression 10]}$$
$$\{\sin(2\pi t \times Sr)+\sin(2\pi t \times 2 \times Sr)\} -$$
$$d(t)\times\{\sin(2\pi t \times Sr)-\sin(2\pi t \times 2 \times Sr)\}$$

is obtained. In terms of the I axis, c(t) and d(t) are signals indicating "±1", and hence it is understood that the signal of "s(t, f2)" becomes a signal of "±cos(2πt/Ts)" or "±cos(2πt× 2/Ts)". Respective temporal wave forms of adjacent waves and desired waves in this case are illustrated in FIGS. 4 and 5. The desired waves and the adjacent waves are overlapped when occurring, and hence center points (black circles of FIG. 5) of symbols are accurately sampled by the sampling point detection circuit 38 as illustrated in FIG. 5 to thereby make it possible to completely remove adjacent wave components. The same result is produced in terms of the Q axis. Herein, the signal of "s(t, f3)", which becomes a signal of "±cos(2πt×2.5/Ts)" or "±cos(2πt×3.5/Ts)", cannot be removed only by the sampling. Therefore, the disturbing wave due to s(t, f3) needs to be removed by the low-pass filter 33. The simulation results in terms of the bandwidth of the low-pass filter and the BER are illustrated in FIG. 6. It is clear that in a case of using a Gaussian filter as the low-pass filter, in order to cause a value of a noise ratio (Eb/N0) to energy per bit necessary for the BER to satisfy approximately $10^{-4}$ to be kept within a deterioration of as low as 6 dB compared to a BER characteristic of a single MSK, the band of the filter needs to be set to be lower than 2.5 times as large as the symbol rate. When it is hard to realize a filter having a steep cut-off characteristic due to such a case where the symbol rate is low, a filter having a somewhat wide band with respect to the symbol rate is used regardless of the lowered BER, which becomes a trade-off in the system.

Next, Example 2 is presented.

The analog filter is used in the above description, but by using a digital filter exhibiting a constant group delay, it is possible to improve the BER characteristic within a range of a narrow band of the filter.

FIG. 7 illustrates a configuration of the receiver used in this case. In FIG. 7, reference symbol 36 denotes a digital filter for extracting a signal component of a main wave band from a digital baseband signal, reference symbol 35a denotes a sampling point detection circuit for detecting a sampling point based on an output from the digital filter 36, and reference symbol 34a denotes an MSK demodulator having an interpolation function of performing an interpolation process on a symbol point based on sampling point detection information, for demodulating an MSK-modulated signal in each channel from data on the symbol point reproduced by the interpolation process. Note that the same components as those illustrated in FIG. 3 are denoted by the same reference symbols, and description thereof is omitted herein. Note that FIG. 7 is different from FIG. 3 in that the digital filter 36 is provided between the A/D converter and the MSK demodulator, and in that the output from the digital filter 36 is input to the sampling point detection circuit to thereby identify a position of the symbol point and the position information is input from the sampling point detection circuit to the MSK demodulator.

An operation thereof is described. In this case, in the same manner as the low-pass filter 33 of FIG. 3, the low-pass filter 33 removes a higher harmonic wave in a relatively wide band to an extent that an alias component occurring upon A/D sampling is not added to a main signal band, and, for example, the A/D converter 24 performs oversampling with 4 times as large as the simple rate. Further, the digital filter 36 is provided at a stage subsequent to the A/D converter 24, and extracts only the main wave component with, for example, the cut-off frequency set to be the narrow band of 0.5 times as large as the symbol rate.

The sampling point detection circuit 35a identifies the position of the symbol point from the data subjected to the 4-times oversampling after passing through the digital filter 36. Based on symbol point position information identified by the sampling point detection circuit 35a, the MSK demodulator 34a reproduces a symbol point by a digital interpolation process, and performs a demodulation process by using reproduced symbol point data.

The sampling point detection circuit 35 of FIG. 3 and the sampling point detection circuit 35a of FIG. 7 can be realized by, for example, a synchronization technology such as a MAP estimation method which is described on pp. 95 to 122 of "Synchronization Technology in Mobile Communications; Chapter 6: Symbol Synchronization", or a technology in which a synchronization signal (preamble) is transmitted from a transmission side and detected by a symbol synchronization circuit (preamble detection circuit) on a reception side.

Note that examples of a method used for a carrier frequency deviation correction include a method of transmitting an unmodulated wave before transmitting modulated data, obtaining a carrier frequency deviation from autocorrelation information with respect to the unmodulated wave on the reception side, and correcting the carrier frequency deviation.

As described above, in this embodiment, the radio communication system according to the present invention is a radio communication system for communicating a signal between a radio transmission device and a radio reception device by using multiple carriers, in which: the radio transmission device includes: a first splitting means for splitting an input digital signal into a plurality of channels; modulating means for modulating a digital signal obtained on a channel basis by the splitting performed by the first splitting means into a signal of a constant envelope modulation scheme, a phase modulation scheme, an amplitude modulation scheme, a frequency modulation scheme, or a modulation scheme of combination thereof, and converting the signal into an analog signal; a first frequency converting means for converting the modulated signal, which has been obtained on a channel basis from the modulating means, into each of carrier frequencies having the frequency spectra in respective adjacent channels mapped with an overlap; amplifying means for amplifying the modulated signal, which has been converted on a channel basis into each of the carrier frequencies by the first frequency converting means, individually with a high efficiency; and transmission means for radio-transmitting the signal, which has been amplified on a channel basis by the amplifying means, to a space on a channel basis; and the radio reception device includes: receiving means for radio-receiving the signal, which has been radio-transmitted to the space; a second splitting means for splitting the signal, which has been received by the receiving means, into each of different channels on a carrier frequency basis; a second frequency converting means for converting the signal, which has been obtained on a channel basis by the splitting performed by the second splitting means, into each of baseband frequencies; demodulating means for converting the modulated signal whose frequency has been converted on a channel basis by the second frequency converting means into a digital signal, and demodulating the digital signal; and restoring means for restoring an original input digital signal from the digital signal, which has been demodulated on a channel basis by the demodulating means. Accordingly, by using: the MSK modulation, which is a constant envelope modulation scheme; the phase modulation scheme; the amplitude modulation scheme; the frequency modulation scheme; or a modulation scheme of combination thereof, as the multicarrier scheme and by enabling frequency spectra of signals in respective channels to overlap in a method of individually amplifying modulated signals, it is possible to perform high-speed communications while preventing a load on an analog circuit (amplifier) from increasing and frequency use efficiency from reducing, which produces effects that an efficiency of the amplifier and the frequency use efficiency are high even when a signal is transmitted at high speed and that it is easy to structure and configure the system.

Second Embodiment

Figure 8:
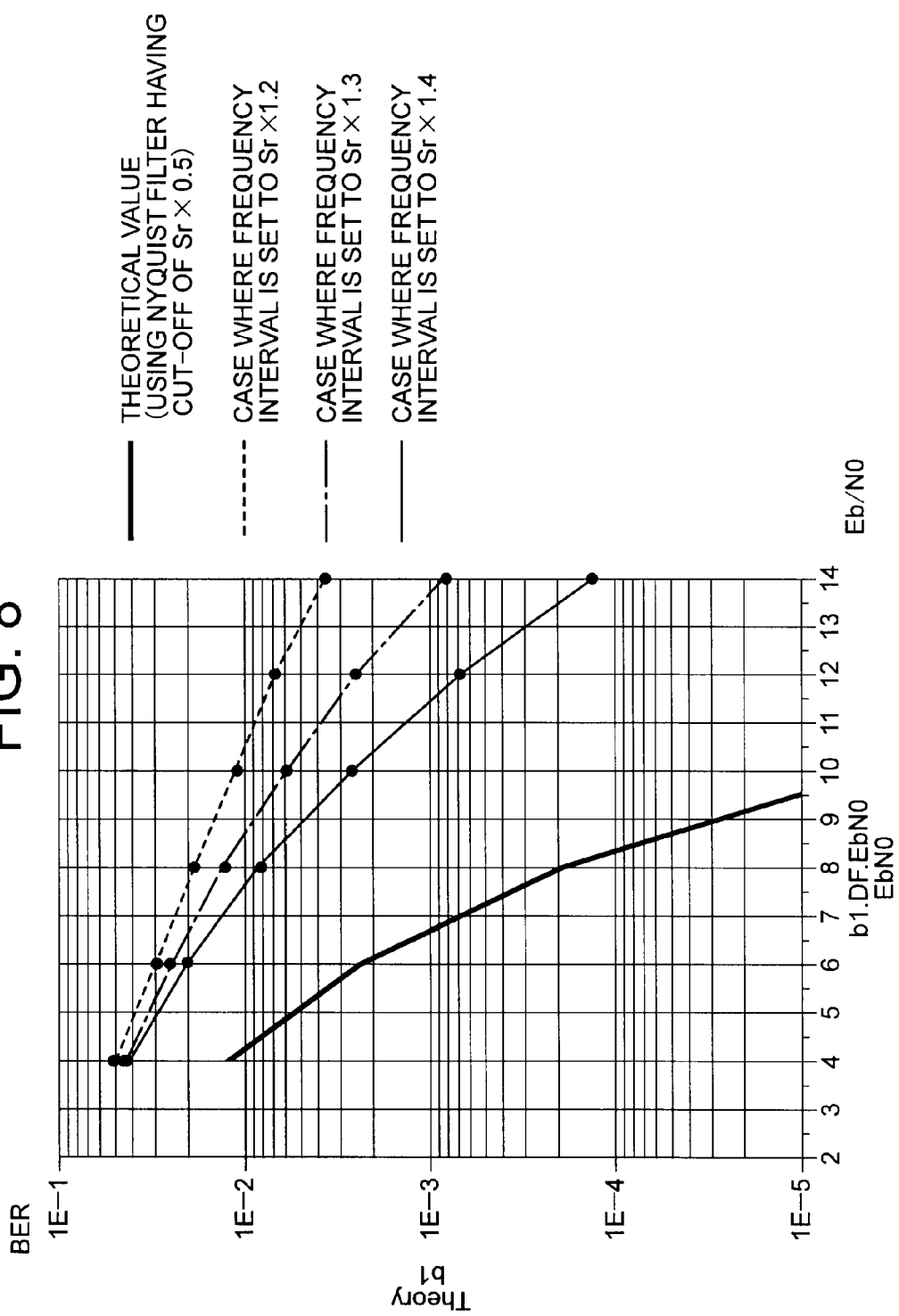
FIG. 8 is a diagram illustrating simulation results produced in a radio communication system according to a second embodiment of the present invention.

Description is made of a radio communication system according to a second embodiment of the present invention with reference to FIG. 8. FIG. 8 illustrates simulation results related to the second embodiment.

The second embodiment is characterized in that: it is possible on the transmission side to set the frequency interval between respective channels to be equal to or more than 1.4 times and less than 3 times as large as the symbol rate of each channel; and on the reception side, a low-pass filter having a cut-off frequency that is 0.5 to 0.7 times as large as the symbol rate is inserted. Note that configurations thereof are basically the same as those presented above with reference to FIGS. 1 to 7, which are therefore used for reference.

A decrease in the frequency intervals between the respective channels lowers the BER due to influences exerted by the adjacent channels, but makes it possible to reduce a frequency bandwidth as a whole. As described above, it is necessary to remove adjacent waves, and hence a filter having a cut-off frequency lower than in the first embodiment is used to thereby make it possible to reduce the adjacent waves and prevents the BER from decreasing. The bandwidth of the filter required in the second embodiment is 0.5 to 0.7 times as large as the symbol rate. The simulation results produced in a case where a Gaussian filter is used as the low-pass filter with a band thereof set to be 0.7 times as large as the symbol rate are illustrated in FIG. 8. It is clear that in the case of setting the frequency interval between the channels to be 1.4 times as large as the symbol rate, the value of the noise ratio (Eb/N0) to the energy per bit necessary for the BER to satisfy approximately $10^{-4}$ is kept within the deterioration of as low as 6 dB compared to the BER characteristic of a single MSK. This method serves as a method of reducing an effective frequency bandwidth particularly in a case where the number of subcarriers is large.

As described above, according to the second embodiment, the same effects as the above-mentioned first embodiment are obtained, and in the second embodiment: the radio transmission device subjects a constant-envelope-modulated signal on a channel basis to frequency conversion with each of carrier frequencies in which frequencies in respective adjacent channels are mapped at frequency intervals each set to be equal to or more than 1.4 times and less than 3 times as large as the symbol rate of each channel; and the radio reception device includes a low-pass filter having a cut-off frequency that is 0.5 to 0.7 times as large as the symbol rate, and suppresses, by the filter, an influence exerted upon the demodulated signal by the adjacent channel. Accordingly, such an effect is obtained that it becomes more possible to reduce the adjacent waves and prevent the BER from decreasing.

Third Embodiment

Figure 9:
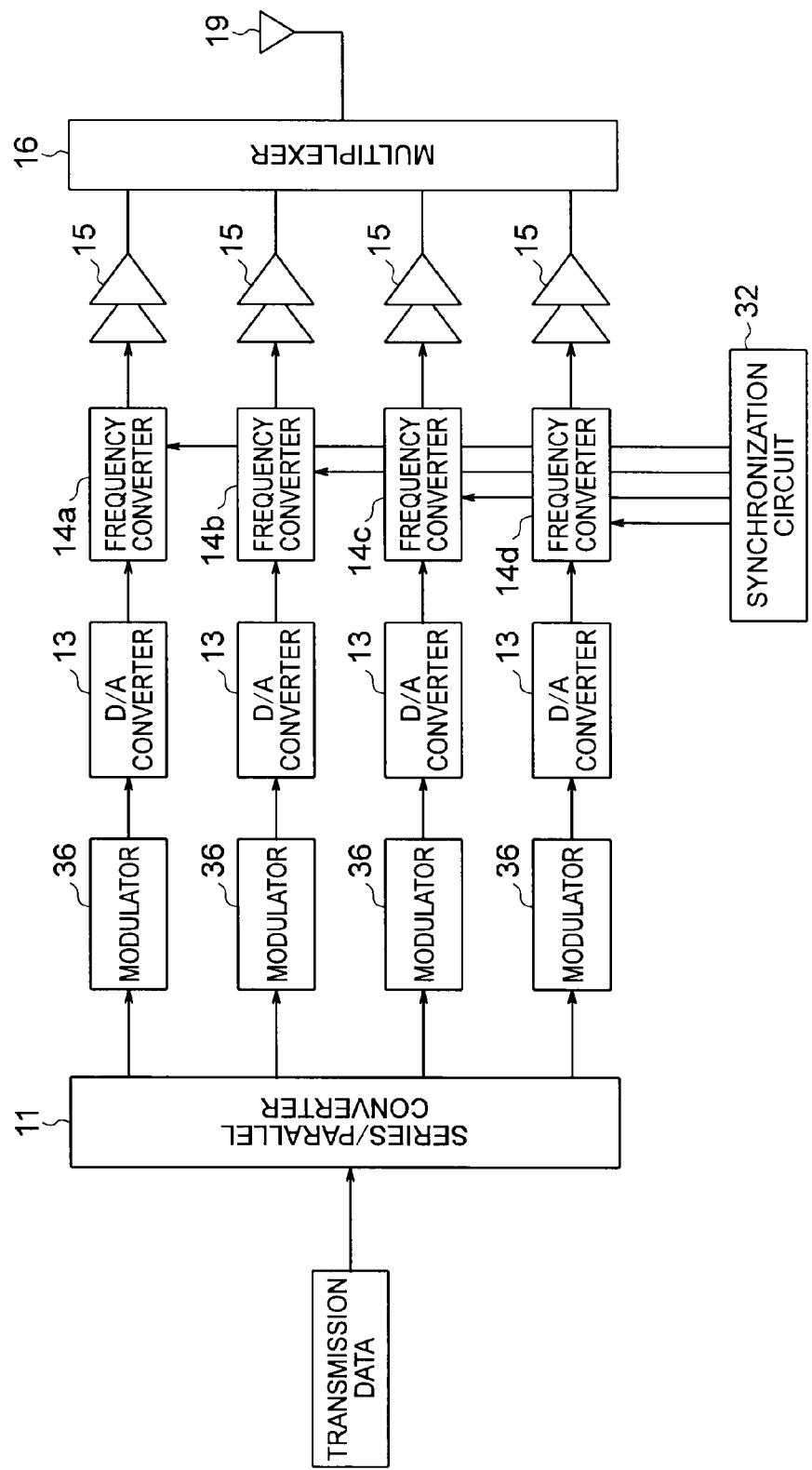
FIG. 9 is a block diagram illustrating a configuration of a radio transmission device included in a radio communication system according to a third embodiment of the present invention.
Figure 10:
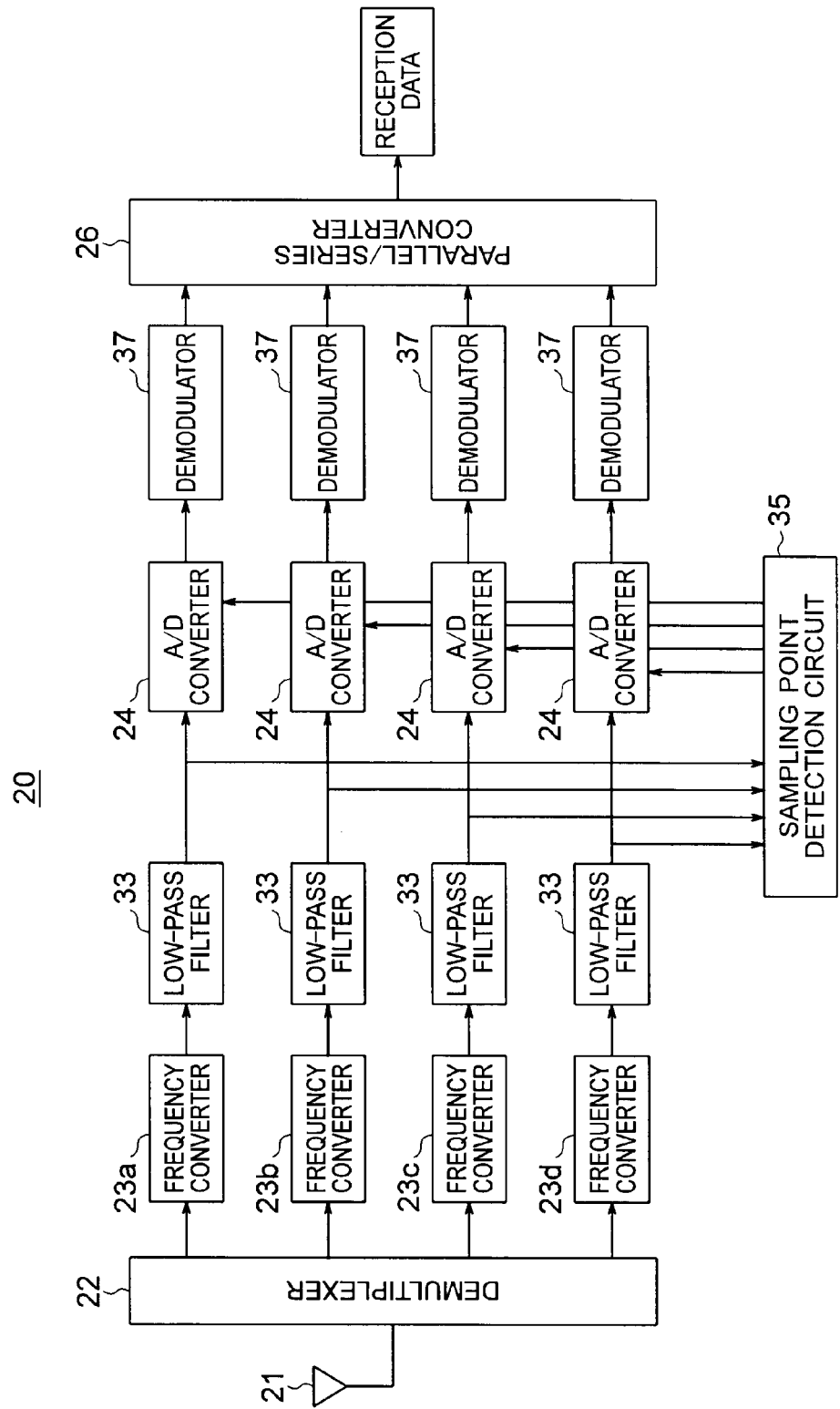
FIG. 10 is a block diagram illustrating a configuration of the radio reception device included in the radio communication system according to the third embodiment of the present invention.
Figure 11:
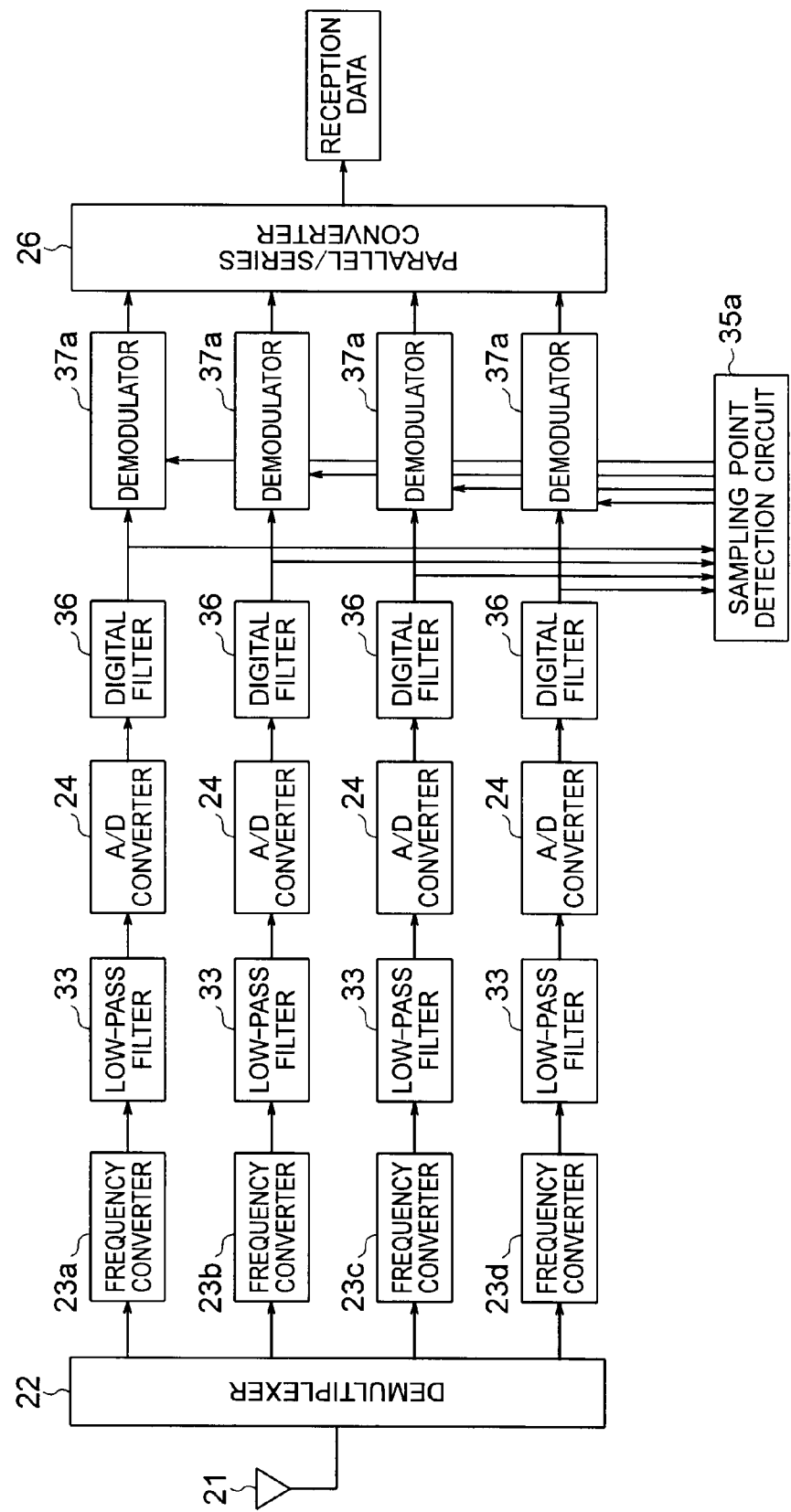
FIG. 11 is a block diagram illustrating a configuration of the radio reception device included in the radio communication system according to the third embodiment of the present invention.
Figure 12:
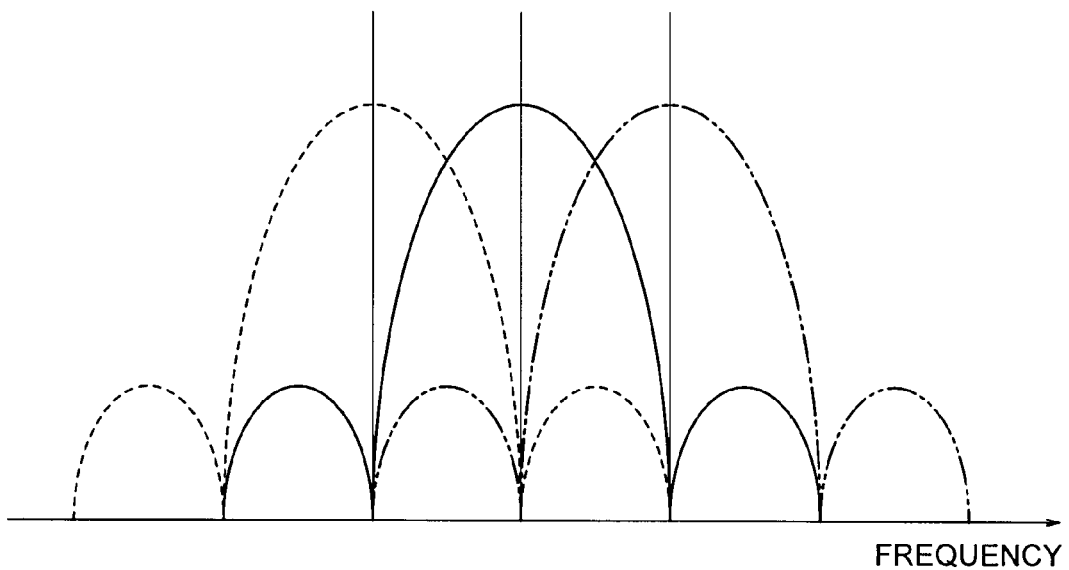
FIG. 12 is a diagram illustrating frequency spectra exhibited in the radio communication system according to the third embodiment of the present invention.
Figure 13:
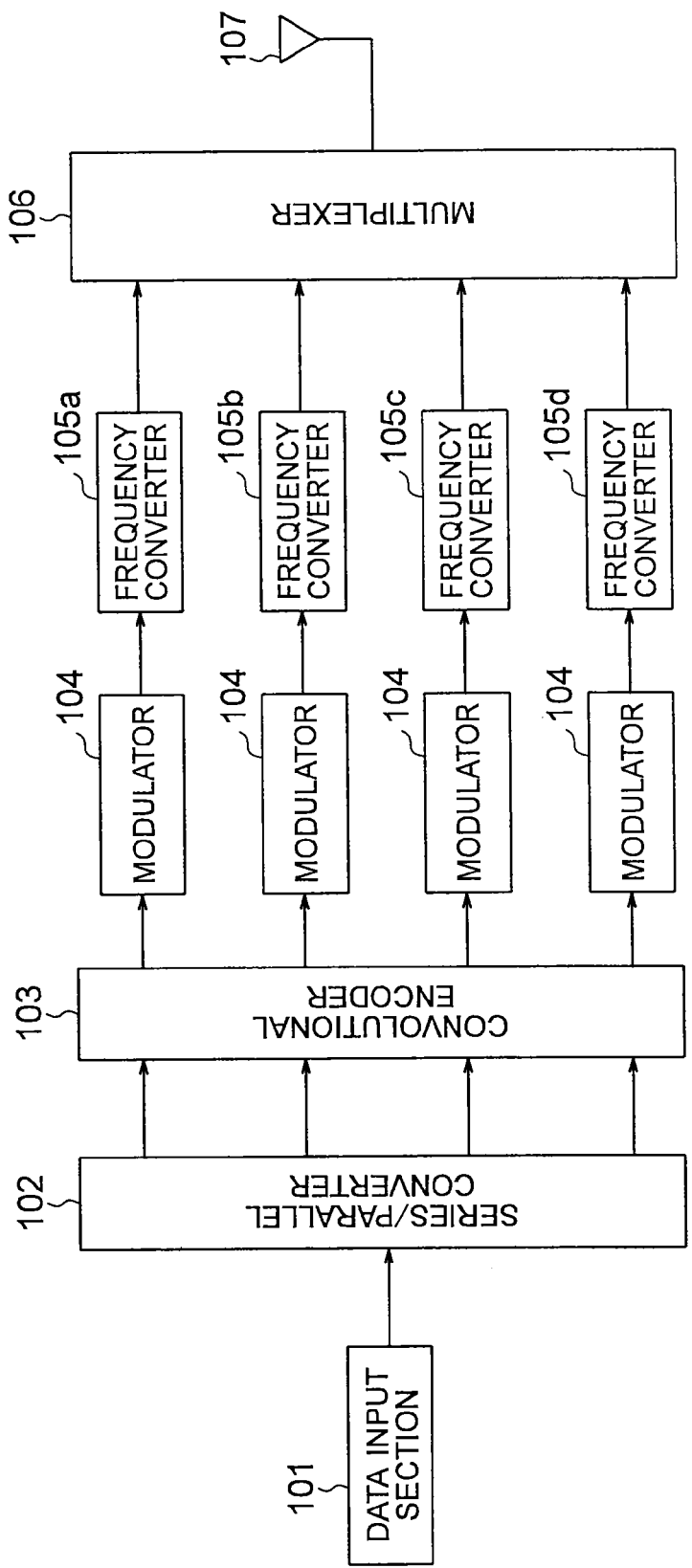
FIG. 13 is a block diagram illustrating a configuration of a conventional radio transmission device which uses multiple carriers.
Figure 14:
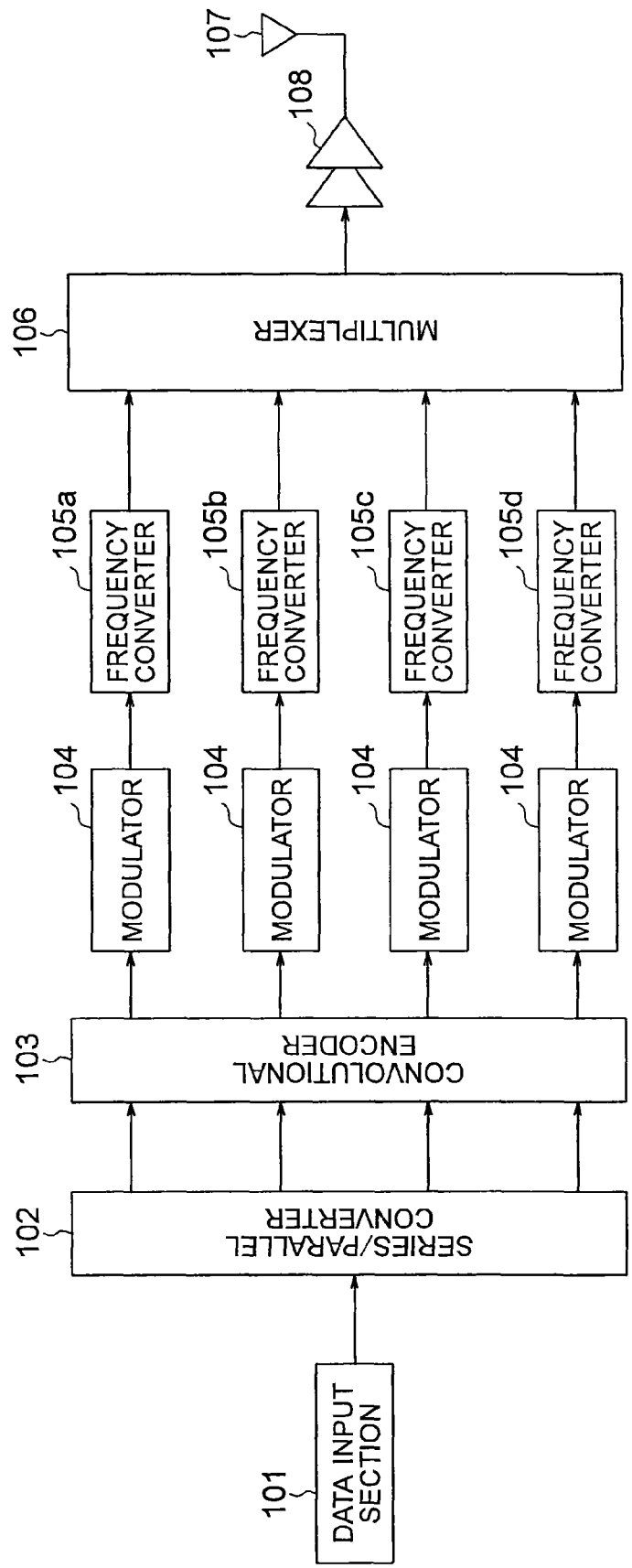
FIG. 14 is a block diagram illustrating a configuration of the conventional radio transmission device which uses multiple carriers.

Description is made of a radio communication system according to a third embodiment of the present invention with reference to FIGS. 9, 10, 11, and 12. FIGS. 9, 10, and 11 are block diagrams illustrating configurations of the radio transmission device and the radio reception device, and FIG. 12 is a diagram illustrating a frequency spectrum.

In FIG. 9, the radio transmission device 10 of the radio communication system according to the third embodiment includes: the series/parallel converter (splitting means) 11; modulators 36 of phase modulation, amplitude modulation, frequency modulation, or a modulation scheme of combination thereof; the D/A converters 13; the frequency converters (first frequency converting means) 14a, 14b, 14c, and 14d; the synchronization circuit 32; the amplifiers (amplifying means) 15; the multiplexer (multiplexing means) 16; and the transmission-purpose antenna 19. Note that the modulator 36 and the D/A converter 13 constitute modulating means. Note that, in FIG. 9, the component denoted by the same reference symbol as in FIG. 1 performs the same operation, and hence the following description is made mainly of their different points.

FIG. 10 illustrates the radio reception device 20 for demodulating the transmission data transmitted from the transmission device 10 of the radio communication system according to the third embodiment, and includes: the reception-purpose antenna 21; the demultiplexer (demultiplexing means) 22; the frequency converters 23a, 23b, 23c, and 23d; the low-pass filters 33; the A/D converters 24; demodulators (demodulating means) 37 of phase modulation, amplitude modulation, frequency modulation, or a modulation scheme of combination thereof; and the parallel/series converter (restoring means) 26. Note that the frequency converter 23 and the A/D converter 24 constitute the second frequency converting means. Note that in FIG. 10, the component denoted by the same reference symbol as in FIG. 3 performs the same operation, and hence the following description is made mainly of their different points.

Hereinafter, description is made of the third embodiment, in which the number of channels is set to 4, with reference to the drawings.

On the side of the radio transmission device 10, as illustrated in FIG. 9, an input digital signal is split into 4 channels by the series/parallel converter 11, and the respective signals that have been obtained by the splitting are modulated by the modulators 36 of a phase modulation scheme, an amplitude modulation scheme, a frequency modulation scheme, or a modulation scheme of combination thereof. Then, the D/A converters 13 convert the signals that have been modulated on a channel basis into analog signals, and the analog signals in the respective channels are subjected to frequency conversion by the frequency converters 14a, 14b, 14c, and 14d having the phases synchronized by the synchronization circuit 32 so that the spectra of the adjacent frequencies are mapped with an overlap. Then, the respective signals are amplified with a high efficiency by the amplifier 15, and are each sent out to a space by the antenna 19.

Note that in the radio transmission device 10, to map the analog signals in the respective channels with the adjacent frequency spectra overlapped, by employing frequency mapping illustrated in FIG. 12, it is possible to reduce an influence exerted upon the main wave by the adjacent waves.

FIG. 12 is a diagram illustrating the frequency spectra. The mapping of the frequency spectra is characterized in that a point at which energy of one of adjacent signals becomes 0 is overlapped with a center frequency of the other signal. This mapping makes an interference component from the adjacent signal relatively small, which can suppress the amount by which the bit error rate (BER) deteriorates from the theoretical value to a lower level. It is natural that, if the BER deterioration is allowed, in order to enhance the frequency use efficiency, the intervals between the respective spectra are further decreased from those of FIG. 12, and the occupied bandwidth in the whole channels may be further narrowed.

On the side of the radio reception device 20, as illustrated in FIG. 10, the received signals are demultiplexed by the demultiplexer 22 and down-converted by the frequency converters 23a, 23b, 23c, and 23d, and then disturbing waves (interference waves) from other channels are removed by the low-pass filters 33. The resultant signals are converted into digital signals by the A/D converters 24, the respective digital signals are demodulated by the demodulators 37 of a phase modulation, an amplitude modulation, a frequency modulation, or a modulation scheme of combination thereof, and the resultant signals are restored into an original data string by the parallel/series converter 26.

Note that also in the third embodiment, as well as in the case of the first embodiment, the sampling point detection circuit 35 illustrated in FIG. 10 detects a sampling (symbol) point timing of each signal, and the detected timing information is used to control a sampling clock of the A/D converter 24 to thereby realize the sampling (symbol) point detection. This symbol point sampling process enables removing the adjacent wave component also in the third embodiment.

Incidentally, the radio reception device 20 according to the third embodiment may be applied to the same configuration as the configuration illustrated in Example 2 (FIG. 7) of the above-mentioned first embodiment. FIG. 11 illustrates a specific configuration diagram thereof. The same components as those illustrated in FIG. 7 are denoted by the same reference symbols, but in FIG. 11, reference symbol 37a denotes a demodulator of a phase modulation scheme, an amplitude modulation scheme, a frequency modulation scheme, or a modulation scheme of combination thereof, which has an interpolation function.

In a radio receiver configuration illustrated in FIG. 11, the components up to the demodulator 37a operate in the same manner as in the first embodiment (FIG. 7), and removes the adjacent waves component from the main waves. The demodulator 37a reproduces a symbol point by a digital interpolation process based on the symbol point position information identified by the sampling point detection circuit 35a, and uses the reproduced symbol point data to perform a demodulation process corresponding to the phase modulation scheme, the amplitude modulation scheme, the frequency modulation scheme, or a modulation scheme of combination thereof. According to this configuration, in the same manner as Example 2 of the above-mentioned first embodiment, the digital signal process makes it easy to realize a low-pass filter for realizing a narrow band characteristic while keeping a group delay characteristic constant, and makes the sampling point detection easier, which can realize a lower cost and higher performance of a radio receiver.

Accordingly, in the third embodiment, the same effects as the above-mentioned first embodiment are obtained, and even in the case of using: the phase modulation scheme; the amplitude modulation scheme; the frequency modulation scheme; or a modulation scheme of combination thereof is used, as in the first embodiment, the low-pass filters removes the disturbing waves (interference waves) from other channels, and the symbol point sampling is performed, and in the same manner as the first embodiment, the high-speed communications can be realized while realizing the improvement in frequency use efficiency and the reduction in load on the analog circuit or the digital circuit. To be specific, by performing multilevel conversion (parallel conversion) by means of hardware, it is possible to alleviate the problems with the higher-speed operation of the digital circuit and the broader band of the baseband circuit, which are detrimental effects exerted by increasing a symbol rate and making a speed higher by performing multilevel modulation, and it is also possible to alleviate the decrease in efficiency due to the PAPR problem derived from fluctuation of the envelope of a signal by individually amplifying the signals in the respective channels. In comparison with a conventional single-carrier scheme having the same communication speed as the proposed scheme, in a case of using the same modulation scheme, the splitting into channels enables reducing the symbol rate, while in a case of having the same symbol rate, it becomes possible to lower a multilevel modulation degree corresponding to the number of channels. In addition, in comparison with a multicarrier scheme using the conventional IFFT/FFT, in the case of using the same modulation scheme, the signals in respective channels are individually amplified to thereby enable reducing the PAPR.

Further, by narrowing the frequency intervals between the respective channels, the BER deteriorates due to the influences exerted by the adjacent channels, but it becomes possible to reduce the frequency bandwidth as a whole. In addition, the BER deterioration due to the adjacent channels can be suppressed by using the low-pass filter for removing the adjacent waves and detecting the sampling points on the reception side.

As has been described above, the radio communication scheme of each of the above-mentioned first to third embodiments makes it possible to perform multilevel conversion by means of hardware. Therefore, it becomes possible to suppress the increase in PAPR. Particularly in the case of using the constant envelope modulation scheme, it becomes possible to set the PAPR to 0, which can cause power consumption to be lower by use of a high-efficiency amplifier. In addition, it becomes possible to reduce an increase rate of the symbol rate, which reduces the loads on devices such as the A/D converter, the D/A converter, and the filter, making it possible to reduce the cost for each single device. Further, a single or a plurality of antennas can be used depending on the system, and hence it becomes possible to satisfy the needs for downsizing/high quality. In addition, the spectra of the adjacent channels can be located with an overlap, and hence the frequency band can be narrowed. Consequently, it becomes possible to provide an inexpensive, high-speed radio communication equipment of high performance.

The invention claimed is:

1. A radio communication system comprising a radio transmission device, and a radio reception device, for communicating a signal between the radio transmission device and the radio reception device by using multiple carriers, wherein:
   the radio transmission device comprises:
      splitting means for splitting an input digital signal into a plurality of channels;
      modulating means for modulating the digital signal obtained on a channel basis by the splitting performed by the splitting means into a constant-envelope-modulated signal, and converting the constant-envelope-modulated signal into an analog signal;
      a first frequency converting means for subjecting the constant-envelope-modulated signal, which has been converted into the analog signal on a channel basis by the modulating means, to frequency conversion into a plurality of carrier frequencies in which frequencies in respective adjacent channels are mapped at frequency intervals each set to be less than 3 times as large as a symbol rate of each channel;
      amplifying means for amplifying the constant-envelope-modulated signal, which has been converted into the analog signal and converted on a channel basis into each of different carrier frequencies by the first frequency converting means, individually with a high efficiency; and
      transmission means for radio-transmitting the constant-envelope signal, which has been converted into the analog signal and amplified on a channel basis by the amplifying means, into space on the channel basis; and the radio reception device comprises:
  receiving means for radio-receiving the constant-envelope-modulated signal, which has been converted into the analog signal and radio-transmitted into space;
  a second frequency converting means for converting the constant-envelope-modulated signal, which has been converted into the analog signal and received by the receiving means, into each of a plurality of baseband frequencies in different channels on a carrier frequency basis, and converting the constant-envelope-modulated signal into a digital signal;
  demodulating means for demodulating the constant-envelope-modulated signal, which has been converted on the channel basis into the baseband frequency and converted into the digital signal by the second frequency converting means; and
  restoring means for restoring an original digital signal from the digital signal, which has been demodulated on the channel basis by the demodulating means.

2. The radio communication system according to claim 1, wherein:
  the radio transmission device further comprises a synchronization circuit for aligning phases, and subjects the constant-envelope-modulated signal on a channel basis to the frequency conversion with each of in-phase carrier frequencies in which frequencies in respective adjacent channels are mapped at frequency intervals each set to be 1.5 times as large as the symbol rate of each channel; and
  the radio reception device further comprises, in the second frequency converting means, a low-pass filter having a cut-off frequency that is 0.5 to 2.5 times as large as the symbol rate of each channel and a sampling detection circuit, and causes the low-pass filter to remove an influence exerted upon the demodulated signal by a channel having a spectrum not overlapped and the sampling detection circuit to remove an influence exerted by the adjacent channel having the spectrum overlapped by performing sampling at a center of a symbol.

3. The radio communication system according to claim 1, wherein:
  the radio transmission device subjects the constant-envelope-modulated signal on a channel basis to the frequency conversion with each of carrier frequencies in which frequencies in respective adjacent channels are mapped at frequency intervals each set to be equal to or more than 1.4 times and less than 3 times as large as the symbol rate of each channel; and
  the radio reception device further comprises, in the second frequency converting means, a low-pass filter having a cut-off frequency that is 0.5 to 0.7 times as large as the symbol rate of each channel, and causes the low-pass filter to suppress an influence exerted upon the demodulated signal by the adjacent channel.

4. The radio communication system according to claim 1, wherein:
  the radio transmission device uses: a phase modulation scheme; an amplitude modulation scheme; a frequency modulation scheme; or a modulation scheme of combination thereof as a modulation scheme, and performs the frequency conversion with each of carrier frequencies in which frequency spectra in respective adjacent channels are mapped with an overlap; and
  the radio reception device further comprises a low-pass filter in the second frequency converting means, and causes the low-pass filter to suppress an influence exerted upon the demodulated signal by the adjacent channel.

5. The radio communication system according to claim 4, wherein the radio transmission device performs the frequency conversion with each of carrier frequencies in which the frequency spectra are mapped so that a point at which energy of one of adjacent signals becomes 0 is overlapped with a center frequency of another signal.

6. A radio transmission device in a radio communication system comprising the radio transmission device and a radio reception device for communicating a signal between the radio transmission device and the radio reception device by using multiple carriers, wherein:
  the radio transmission device comprises:
    splitting means for splitting an input digital signal into a plurality of channels;
    modulating means for modulating the digital signal obtained on a channel basis by the splitting performed by the splitting means into a constant-envelope-modulated signal, and converting the constant-envelope-modulated signal into an analog signal;
    a first frequency converting means for subjecting the constant-envelope-modulated signal, which has been converted into the analog signal on a channel basis by the modulating means, to frequency conversion into a plurality of carrier frequencies in which frequencies in respective adjacent channels are mapped at frequency intervals each set to be less than 3 times as large as a symbol rate of each channel;
    amplifying means for amplifying the constant-envelope-modulated signal, which has been converted into the analog signal and converted on a channel basis into each of different carrier frequencies by the first frequency converting means, individually with a high efficiency; and
    transmission means for radio-transmitting the constant-envelope signal, which has been converted into the analog signal and amplified on a channel basis by the amplifying means, into space on the channel basis; and
  the radio reception device comprises:
    receiving means for radio-receiving the constant-envelope-modulated signal, which has been converted into the analog signal and radio-transmitted into space;
    a second frequency converting means for converting the constant-envelope-modulated signal, which has been converted into the analog signal and received by the receiving means, into each of a plurality of baseband frequencies in different channels on a carrier frequency basis, and converting the constant-envelope-modulated signal into a digital signal;
    demodulating means for demodulating the constant-envelope-modulated signal, which has been converted on the channel basis into the baseband frequency and converted into the digital signal by the second frequency converting means; and
    restoring means for restoring an original digital signal from the digital signal, which has been demodulated on the channel basis by the demodulating means.

7. A radio reception device in a radio communication system comprising a radio transmission device and the radio reception device for communicating a signal between the radio transmission device and the radio reception device by using multiple carriers, wherein:

the radio transmission device comprises:

splitting means for splitting an input digital signal into a plurality of channels;

modulating means for modulating the digital signal obtained on a channel basis by the splitting performed by the splitting means into a constant-envelope-modulated signal, and converting the constant-envelope-modulated signal into an analog signal;

a first frequency converting means for subjecting the constant-envelope-modulated signal, which has been converted into the analog signal on a channel basis by the modulating means, to frequency conversion into a plurality of carrier frequencies in which frequencies in respective adjacent channels are mapped at frequency intervals each set to be less than 3 times as large as a symbol rate of each channel;

amplifying means for amplifying the constant-envelope-modulated signal, which has been converted into the analog signal and converted on a channel basis into each of different carrier frequencies by the first frequency converting means, individually with a high efficiency; and transmission means for radio-transmitting the constant-envelope signal, which has been converted into the analog signal and amplified on a channel basis by the amplifying means, into space on the channel basis; and the radio reception device comprises:

receiving means for radio-receiving the constant-envelope-modulated signal, which has been converted into the analog signal and radio-transmitted into space;

a second frequency converting means for converting the constant-envelope-modulated signal, which has been converted into the analog signal and received by the receiving means, into each of a plurality of baseband frequencies in different channels on a carrier frequency basis, and converting the constant-envelope-modulated signal into a digital signal;

demodulating means for demodulating the constant-envelope-modulated signal, which has been converted on the channel basis into the baseband frequency and converted into the digital signal by the second frequency converting means; and restoring means for restoring an original digital signal from the digital signal, which has been demodulated on the channel basis by the demodulating means.

8. A radio transmission device for transmitting a signal to a radio reception device by using multiple carriers, comprising:

splitting means for splitting an input digital signal into a plurality of channels;

modulating means for modulating the digital signal obtained on a channel basis by the splitting performed by the splitting means into a constant-envelope-modulated signal, and converting the constant-envelope-modulated signal into an analog signal;

frequency converting means for subjecting the constant-envelope-modulated signal, which has been converted into the analog signal on a channel basis by the modulating means, to frequency conversion into a plurality of carrier frequencies in which frequencies in respective adjacent channels are mapped at frequency intervals each set to be less than 3 times as large as a symbol rate of each channel;

amplifying means for amplifying the constant-envelope-modulated signal, which has been converted into the analog signal and converted on a channel basis into each of different carrier frequencies by the first frequency converting means, individually with a high efficiency; and transmission means for radio-transmitting the constant-envelope signal, which has been converted into the analog signal and amplified on a channel basis by the amplifying means, into space on the channel basis.

\* \* \* \* \*